(12) United States Patent
Capps et al.

(10) Patent No.: US 10,163,334 B1
(45) Date of Patent: Dec. 25, 2018

(54) WIRELESS REMOTE CONTROL SYSTEM FOR A VACUUM MATERIAL HANDLER

(71) Applicant: Vacuworx Global, LLC, Tulsa, OK (US)

(72) Inventors: Cory Capps, Owasso, OK (US); David James Keener, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 0 days.

(21) Appl. No.: 15/415,250

(22) Filed: Jan. 25, 2017

(51) Int. Cl.
| | |
|---|---|
| *G08C 17/02* | (2006.01) |
| *B25J 15/06* | (2006.01) |
| *B66C 13/40* | (2006.01) |
| *B66C 1/02* | (2006.01) |
| *G08B 6/00* | (2006.01) |
| *G08B 5/38* | (2006.01) |
| *H04W 52/02* | (2009.01) |
| *H04B 1/3827* | (2015.01) |
| *H04B 1/713* | (2011.01) |
| *H04W 12/06* | (2009.01) |
| *H04W 76/14* | (2018.01) |
| *H04W 4/80* | (2018.01) |

(52) U.S. Cl.
CPC .......... *G08C 17/02* (2013.01); *B25J 15/0625* (2013.01); *B66C 1/0256* (2013.01); *B66C 13/40* (2013.01); *G08B 5/38* (2013.01); *G08B 6/00* (2013.01); *H04B 1/385* (2013.01); *H04W 52/0254* (2013.01); *H04B 1/713* (2013.01); *H04B 2001/3861* (2013.01); *H04W 4/80* (2018.02); *H04W 12/06* (2013.01); *H04W 76/14* (2018.02)

(58) Field of Classification Search
CPC .... G08C 17/02; B25J 15/0625; B66C 1/0256; G08B 5/38; G08B 6/00; H04B 1/385; H04B 1/713; H04B 2001/3861; H04W 52/0254; H04W 76/14; H04W 4/80; H04W 12/06; H04W 76/023; H04W 4/008
USPC ....................................................... 340/12.5
See application file for complete search history.

(56) References Cited

U.S. PATENT DOCUMENTS

2017/0203444 A1* 7/2017 Rickhardsson ...... B25J 15/0625
2017/0203929 A1* 7/2017 Wigren ................ B65G 47/917

* cited by examiner

*Primary Examiner* — Ali Neyzari
(74) *Attorney, Agent, or Firm* — Chad Hinrichs

(57) ABSTRACT

A system and method for controlling the operation of a vacuum material handler providing secure communication between the wireless remote control and the receiver of a controller on the vacuum material handler. The system providing a haptic confirmation of a valid command. The system also providing a battery life extending sleep mode when left inactive for a predetermined length of time. The system further including a pendant remote in communication with the wireless remote control. The pendant remote being operable to command the vacuum material handler.

9 Claims, 8 Drawing Sheets

WIRELESS REMOTE CONTROL SYSTEM FOR A VACUUM MATERIAL HANDLER

1. FIELD OF THE INVENTION

The present invention relates generally to controls for a vacuum material handler. More particularly, the present invention relates to a wireless remote control for a vacuum material handler.

2. BACKGROUND OF THE INVENTION

Vacuum material handlers mounted on the boom of an excavator, backhoe or other heavy equipment are commonly used to move large diameter pipe and flat stock steel. These lifters have one or more have vacuum pads which are contoured to the item being lifted. The boom is maneuvered to put the vacuum pad in contact with the surface of the item to be lifted. Once in contact a valve is opened to create a vacuum between the pad and the surface of the item. When the vacuum reaches an acceptable level, the boom can be maneuvered to lift the item.

Operation of the valve between the vacuum pad and the vacuum source and other functions of the vacuum material handler have traditionally been controlled by a wired remote. That is to say a remote control which transmits control signals to the vacuum material handler via a hard wire extending from the remote control to the vacuum material handler.

The use of a hardwire remote control requires a control wire be installed on the excavator or other heavy equipment. This adds to the time and expense of installation of the vacuum material handler. There is also a risk the control wire will be severed or otherwise damaged during the operation of the excavator. For that reason wireless remote controls have come into use. However, wireless remotes face limitations due to their dependence on batteries and the security of their communication link with the controller on the vacuum material handler.

What is needed, therefore, is a wireless remote control for a vacuum material handler that does not require a hard wire extending from the remote control to the vacuum material handler, yet has a significant battery life and secure communications with the controller on the vacuum material handler.

BRIEF SUMMARY OF THE INVENTION

The present invention achieves its objections by providing a wireless remote control system for a vacuum material handler. The present invention provides secure operation through use of 64 Bit addressing, frequency hopping spread spectrum technology, and serial communications framing of data packs containing operation commands. Haptic feedback is used to provide the operator with confirmation of successful entering of commands. The remote control counts the number of lift cycles and other operational information. Such information is useful in tracking maintenance of the equipment.

The remote control has a sleep mode which conserves battery life during times of inactivity. The remote can be brought out of sleep mode by simply pushing one of the buttons. Battery life is further increased by connecting the remote control to an external power source which can power operation of the remote control and/or recharge the battery.

Additional functionality of the present invention is provided by a pendant control. The pendant control may be worn on the wrist of the operator and provides a way to carry out the most frequent functions of the material vacuum handler, namely lift, release and emergency stop. In the preferred embodiment the pendant control is linked with the remote control via a Blue Tooth connection.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
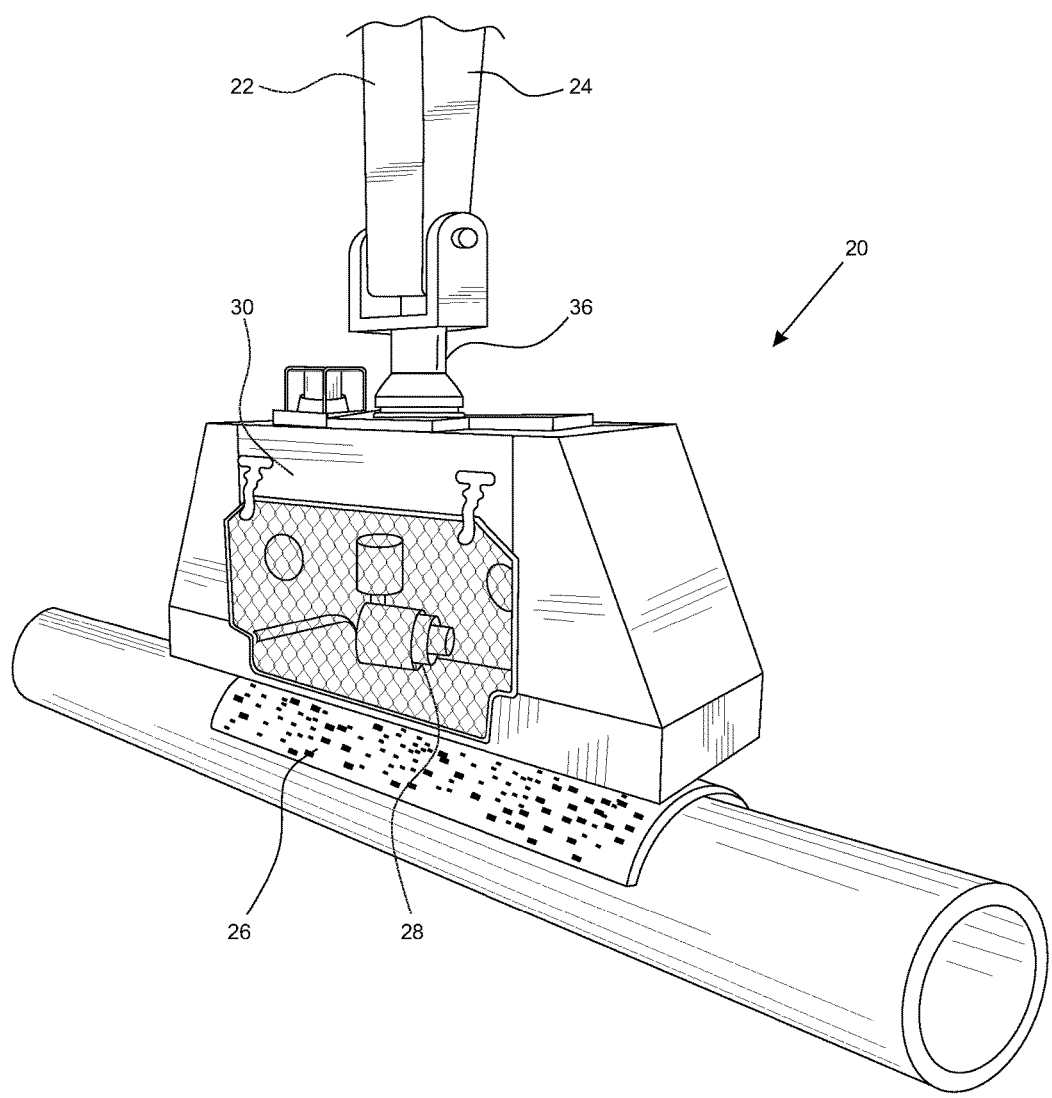
FIG. 1 is a perspective view of a vacuum material handler mounted on the boom of an excavator and lifting a pipe.

Turning now to the drawings wherein like reference characters indicate like or similar parts throughout, FIG. 1 illustrates a vacuum material handler 20 on the end the boom 22 on a piece of heavy equipment 24 such as an excavator, backhoe or the like. The vacuum material handler 20 may be used to move large heavy objects such as pipe, steel plates, traffic barriers and the like. The vacuum material handler 20 is rotatable relative to the end of the boom 22. The vacuum material handler has one or more vacuum pads 26 in fluid communication with a vacuum source 28. The object to be moved is lifted by putting the pad 26 in contact with the object. The vacuum source 28 then creates a vacuum between the pad 26 and the object. Once the vacuum is great enough the object can be lifted.

Figure 2:
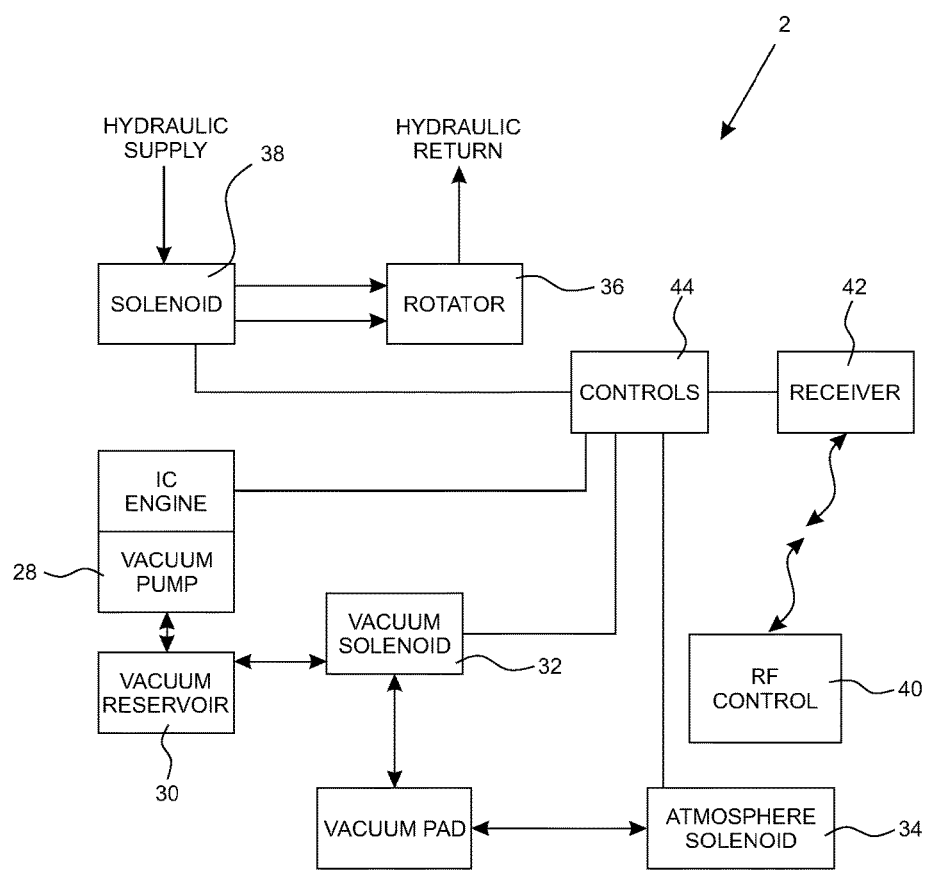
FIG. 2 is a schematic of the vacuum material handler and the preferred embodiment of the wireless remote control system of the present invention.
Figure 3:
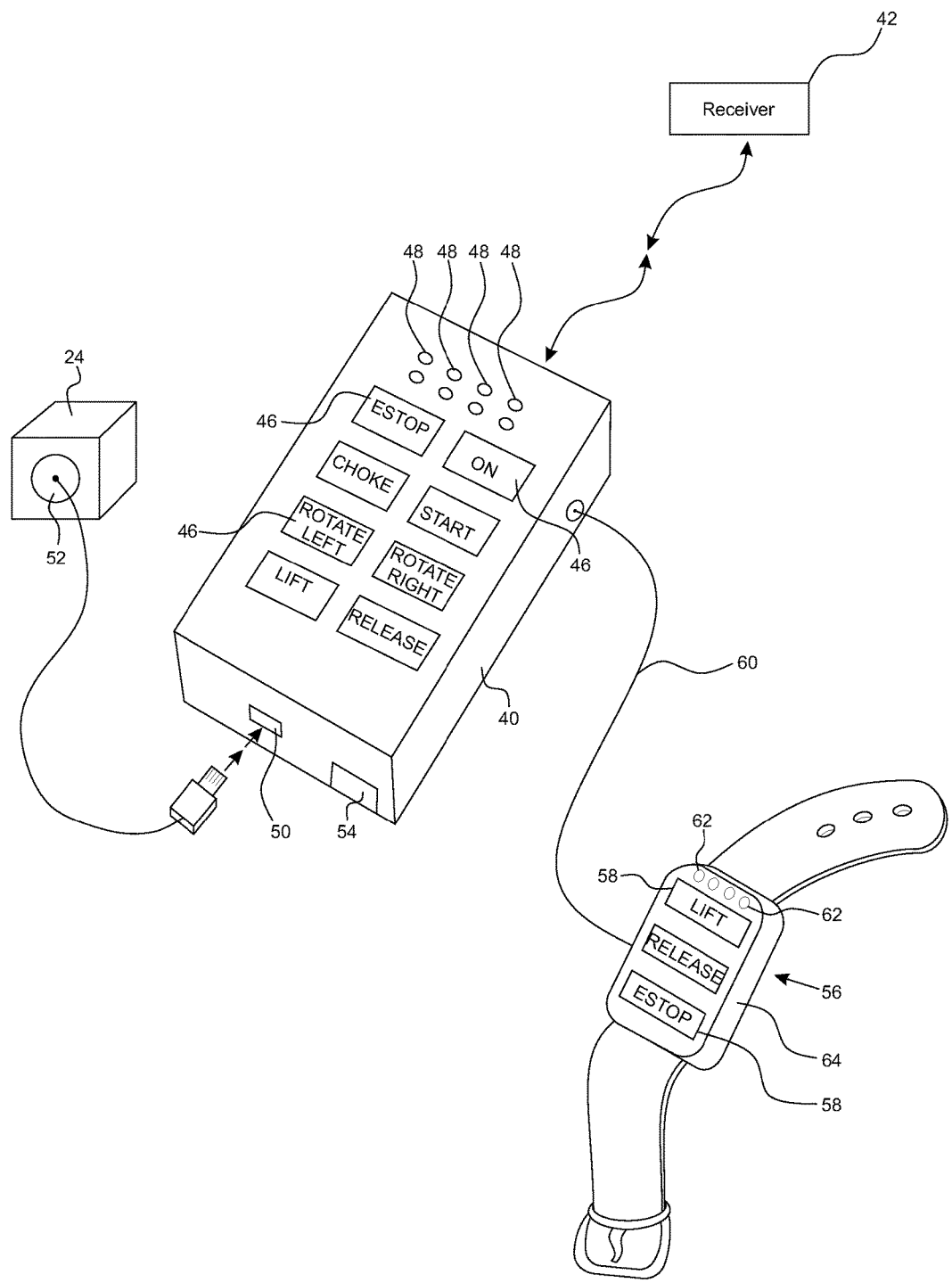
FIG. 3 is a schematic of the wireless remote control and the pendent remote of the present invention.
Figure 4:
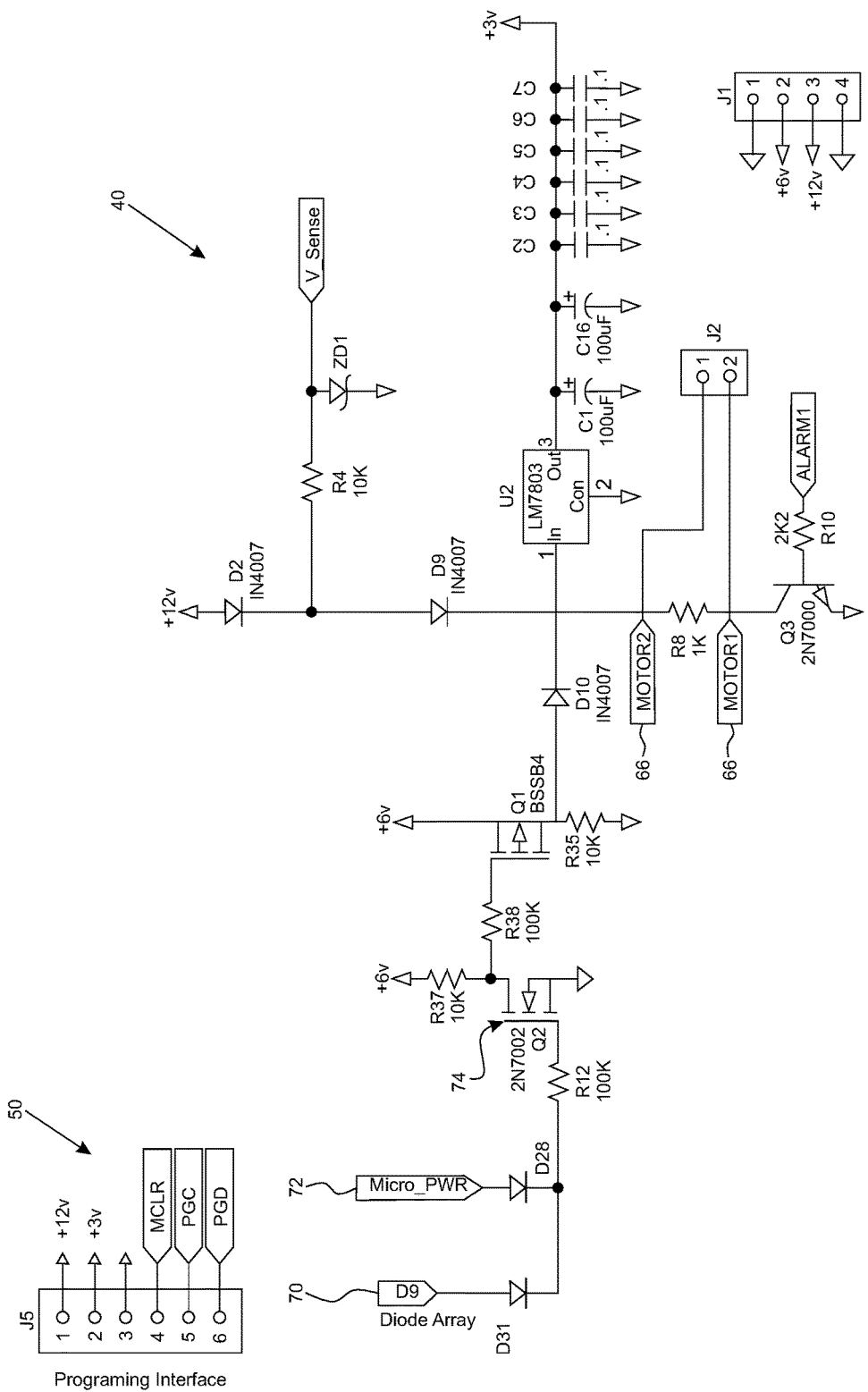
FIG. 4 is a circuit diagram of the preferred embodiment of the remote control.
Figure 5:
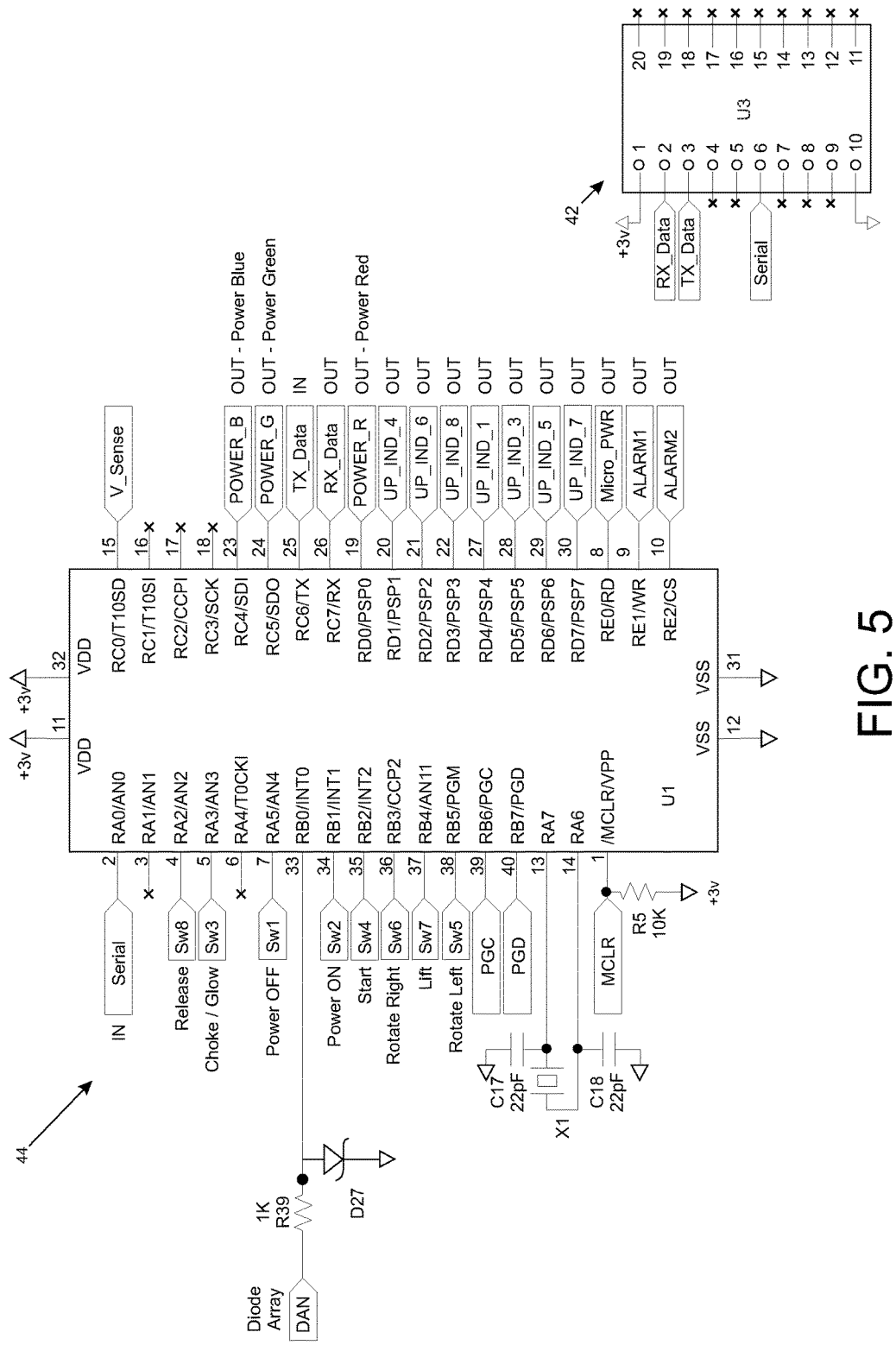
FIG. 5 is a circuit diagram of the preferred embodiment of the controller and receiver.
Figure 6:
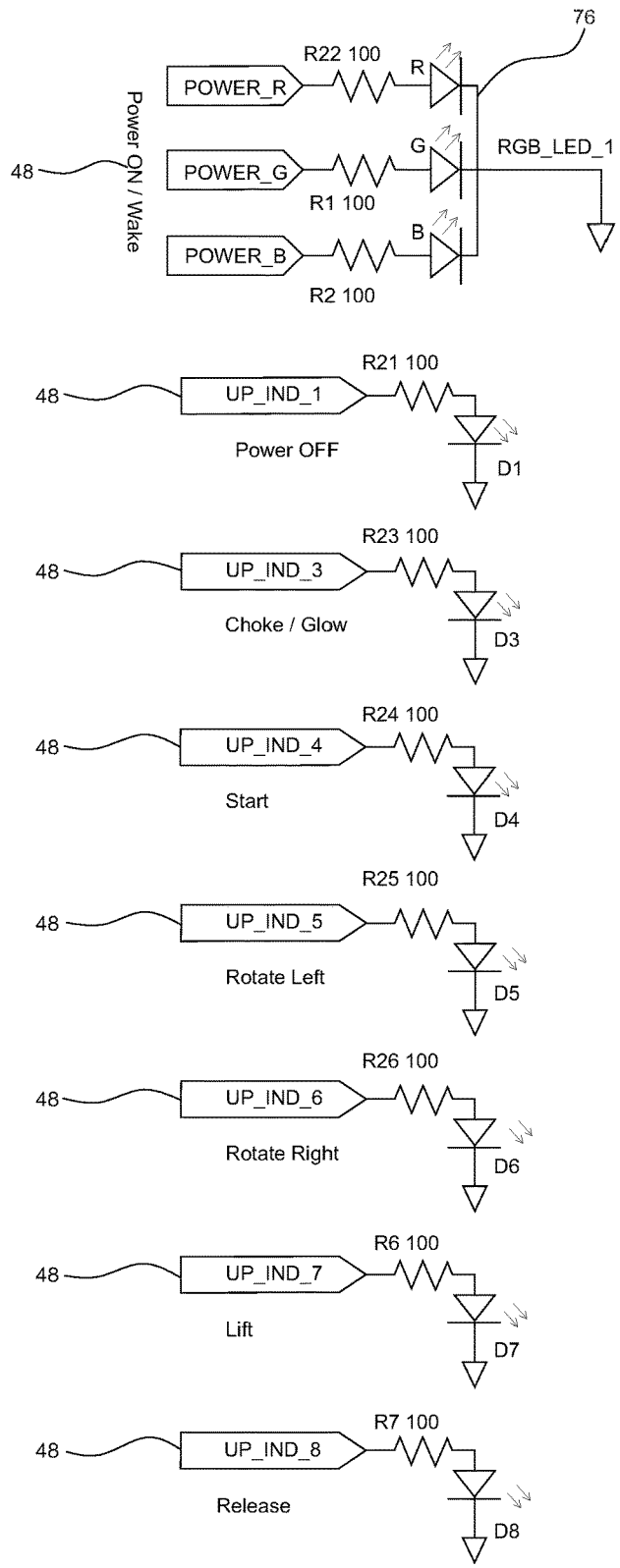
FIG. 6 is a circuit diagram of the indicator lights/LEDs of the preferred embodiment.
Figure 7:
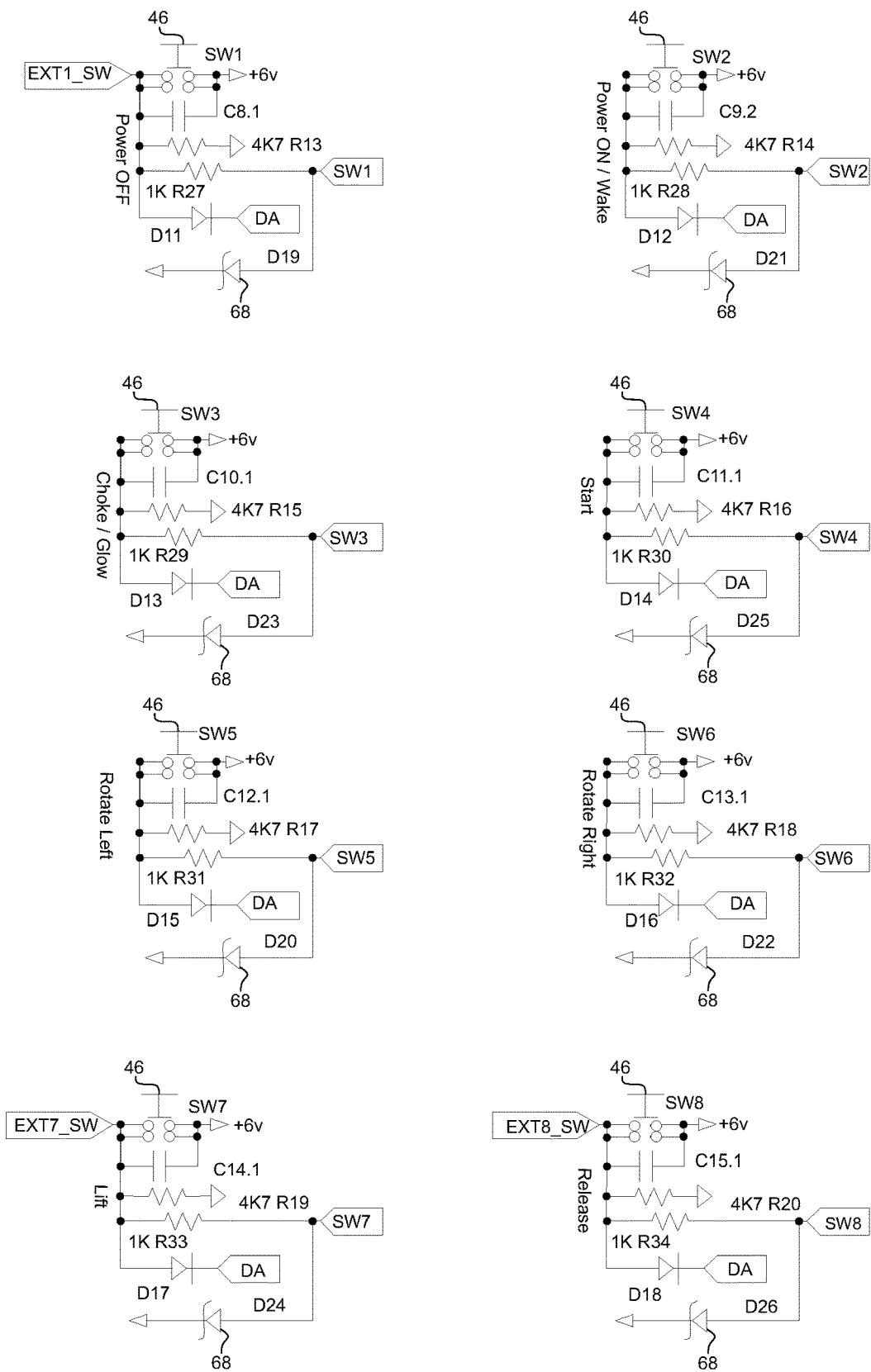
FIG. 7 is a circuit diagram of the buttons on the preferred embodiment of the remote control.
Figure 8:
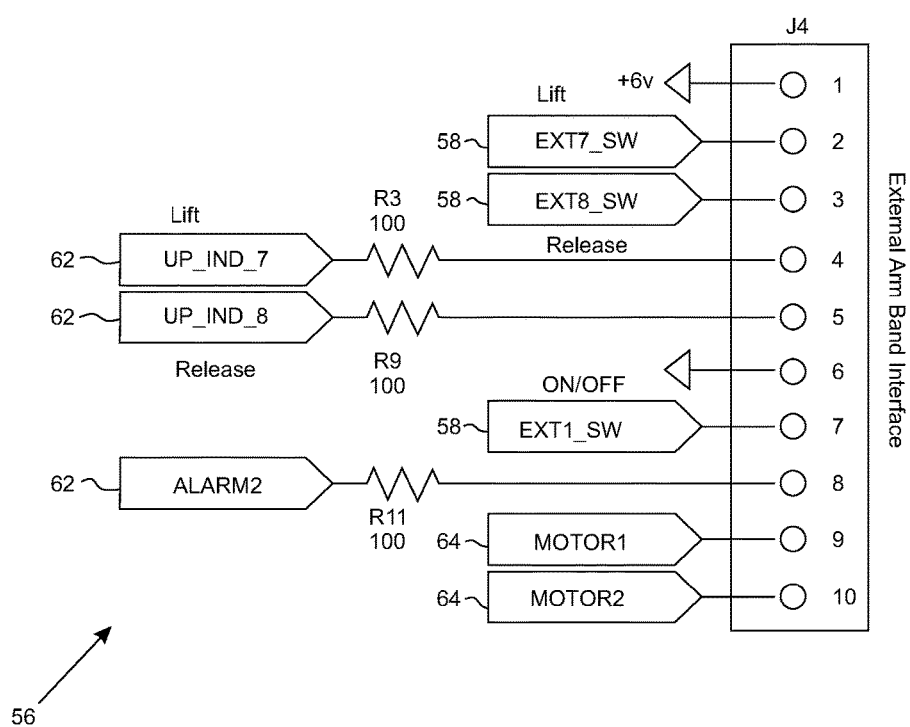
FIG. 8 is a circuit diagram of the pendant control of the preferred embodiment.

FIG. 2 provides the flow diagram for the vacuum material handler 20. Vacuum lines are shown with a single line having an arrow on each end. Hydraulic lines are shown with a single line with a single arrow indicating direction of flow. Control wires are shown in a single line without arrows. Wireless communications are shown in consecutive single lines with arrows on the ends of each line.

The vacuum source 28 is typically in fluid communication with a vacuum reservoir 30 which in turn is in fluid communication with the vacuum pad 26. A solenoid operates isolation valve 32 located between the vacuum reservoir 30 and the vacuum pad 26 have the ability to terminate or open and close the fluid communication between the reservoir 30 and the pad 26. A solenoid operated atmosphere valve 34 is in fluid communication with the vacuum pad 26. When the atmosphere valve 34 is open the vacuum pad 26 is in fluid communication with atmosphere. When the atmosphere valve 34 is closed and the vacuum pad 26 is in contact with an object to be lifted, the vacuum pad 26 is not in fluid communication with the atmosphere and vacuum pressure can build or be held between the vacuum pad 26 and the object to be lifted.

In order to grasp an object, the isolation valve 32 must be open and the atmosphere valve 34 must be closed. Once grasped the object may be maneuvered into the desired location through operation of the boom 22 and rotation of the material handler 20 via operation of a rotator 36. Operation of the rotator 36 is done by opening and closing one or more solenoid operated valves 38 which control the flow of hydraulic fluid to the rotator 36. Once in place the object may be released by closing the isolation valve 32 and opening the atmosphere valve 34. This eliminates the vacuum between the vacuum pad 26 and the object.

The wireless remote control 40 of the present invention is used by an operator to control vacuum material handler 20. The wireless remote control 40 uses a 64 bit addressing scheme. This provides a nearly impossible number of combinations, ($1.84 \times 10^{19}$ combinations), to be falsely authenticated. Security is further enhanced by the use of frequency hopping spread spectrum technology (FHSS). FHSS sends commands over a predetermined sequence of frequencies. The wireless commands are sent in serial communications format. This requires authentication packets be sent by the remote control 40 and received by the receiver 42 and passed onto the control module 44.

The addressing scheme is 64 bit and the data payload itself is another 11 bits of serial overhead on top of that—a start bit, eight data bits, a stop bit, and a parity bit. So while the remote control 40 and receiver 42 are in lock-step frequency hopping with each other, data is being transmitted over this ever-changing frequency link. The data preamble is also in place—but it too requires the proper 64 bit addressing scheme, the proper start bit, the proper data bit, stop bit and parity bit—if any of this is damaged during transmission, the command is discarded without action. Once the command is received, the receiver 42 sends a confirmation signal to the remote control 40.

The operator enters the commands by operation of the buttons 46 on the remote control 40. The command is not sent by the remote control 40 until the operator depresses the button 46 for 2 seconds. Safety is further increased by the remote control 40 providing the operator with haptic signal such as a vibration or pulse from a haptic motor 66 to confirm the command has been safely received by the receiver 42. The safe receipt of a command may also be indicated by the illumination of a light or LED 48 on the remote control 40. Likewise, a failed command may be indicated by the illumination of a different light or LED 48. Certain commands such as the opening of the atmosphere valve 34, i.e. the release of the pipe or other load, may require the operator to depress two buttons 46 simultaneously. This reduces the likelihood of inadvertently dropping a pipe or other load.

In the preferred embodiment The remote control 40 responds differently when a command is issued but not received by the receiver 42 it is married to. The haptic signal fails to occur should this happen, and the LED 48 illuminates on the remote control 40 after a predetermined period of time. This indicates to the operator there is a problem.

On a valid transmission, the remote control 40 issues the command, the receiver 42 receives it and sends an acknowledgement response back to the remote control 40. Specifically, when the button 46 on the remote control 40 is released a specific character such as a left bracket, "[", is sent to the receiver 42 and onto the controller 44. The controller 44 responds by sending a specific character such as a right bracket, "]", to the remote control 40 via the receiver 42. The command string is then sent from the remote control 40 to the receiver 42 and onto the controller 44 This causes the haptic signal to occur in the remote control 40 and the LED 48 for the command extinguishes. When the button 46 is released the remote sends a specific character such as exclamation point, "!", to the receiver 42 and onto the controller 44.

Further, should something happen to the vacuum level on the vacuum material handler 20, such as a tear in a seal or a vacuum leak, the receiver 42 sends a notification to the remote control 40 which causes a haptic signal and a flashing LED 48 to alert the operator to the problem. This is accomplished by the controller 44 monitoring the vacuum level. If it drops below a preset level, preferably 17 inches Hg the controller 44 sends a signal to the remote control 40 which provides the operator with the haptic signal and/or flashing LED 48. In the preferred embodiment this function is not enabled until one lift cycle has been completed, i.e. the lift button has been pressed and the release button has been pressed The controller 40 counts the number of lift cycles the vacuum material handler 20 has performed. In the preferred embodiment this is accomplished by counting the number of times the release button is pressed. Each time the release button is released a specific character such as an exclamation point, "!", is sent to the receiver 42 and onto the controller 44. Thus the controller 44 has a count for each time the release button is released. The count may be used to track the maintenance and service intervals of the equipment. It may also be used to confirm the extent of use of the vacuum material handler 20 by a rental customer. Further, the rental terms may include a fee for each lift.

In the preferred embodiment the number of lifts may be reset or cleared by operation of the remote control 40, specifically by pressing the ON and RELEASE buttons simultaneously. Similarly, the count can be read on the remote, by pressing the ESTOP (emergence stop) and ON buttons 46 simultaneously. The lift count is then displayed through a series of blinks of the LEDs 48 indicating thousands, hundreds, tens and ones separated by a pause. For example, if there were 1246 lifts, the LED 48 would blink once, then pause, blink twice, then pause, blink four times then pause and blink six times.

In the preferred embodiment of the present invention one of the LEDs 48 on the remote control 40 is an RGB LED 76. That is it is an LED capable of illuminating in different colors, red, green or blue. This provides additional ways to communicate the status of the vacuum material handler 20. It is also possible to use more than one multicolored LED as well as LEDs with other colors.

The remote control 40 has a sleep mode to conserve battery life. The sleep mode is started when the remote control 40 has been inactive for a predetermined amount of time. In the preferred embodiment the sleep mode is started by one minute of inactivity.

Each time a button 48 on the remote control 40 is pressed it sends a −5 volt signal from the button's Zener diode 68 to the diode array 70 on the remote control 40. This causes the micro power diode 72 to provide a continuous +5 volt sign for 60 seconds to the N-channel MOSFET 74. So long as the N-channel MOSFET 74 has a +5 volt signal it will continue to provide power to the remote control 40. However, if another button 48 is not pushed within that 60 seconds the micro power diode 72 will drop the continuous +5 volt signal and the N-channel MOSFET 74 will terminate the power supply to the controller 44 thus putting the remote control 40 in sleep mode. If any button 48 is pushed, this routine is executed again and the micro power diode 72 will provide a continuous +5 volt signal for 60 seconds to the N-channel MOSFET 74 which in turn provides power to the remote control 40.

The sleep mode and the resulting suspension of the communication link between the remote control 40 and the receiver 42 may be indicated by the illumination of one or more of the LEDs on the remote control 40. The link between the remote control 40 and receiver 42 is instantaneously re-established once a button 46 on the remote control 40 is pressed.

The remote control 40 also has a receptacle 50 which can be used to connect it to an external power source 52, i.e. "shore power", such as the heavy equipment 24 carrying the vacuum material handler 20. This conserves and/or recharges the remote control's 40 internal batteries 54. In the preferred embodiment the remote control 40 does not enter sleep mode when on shore power. Likewise, shore power is indicated by the illumination of one or more LEDs 48 on the sets the remote control 40. In the preferred embodiment the receptacle 50 is a USB format.

External programming of the remote control 40 through the receptacle 50 eliminates the need to physically open up the remoted control 40 to install new firmware. Firmware revision numbers can be indicated by the blinks of the LEDs 48 in the same manner as the lift count. The revision number may be revealed by pressing a predetermine sequence of buttons 46. In the preferred embodiment this is accomplished by simultaneously pressing the ESTOP (emergence stop) and LIFT buttons 46.

The present invention may further be provided with a pendant control 56 which communicates with the remote control 40 and can be used to enter certain commands. In the preferred embodiment the pendant control 56 is wearable on the wrist of the operator. It communicates with the remote control 40 via a hardwire connection 60, such as a high density connector with a multi-conductor cable. The pendant control 54 has buttons 58 which can be used to enter the LIFT, RELEASE and ESTOP (emergence stop) commands. The pendant control 56 may also be equipped with one or more indicator lights/LEDs 62 and/or a haptic feedback motor 64 to be used in the same manner as those elements found on the remote control 40.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A vacuum material handler wireless remote system comprising:
   a vacuum material handler mountable on a boom;
   the vacuum material handler having a vacuum source in fluid communication with a vacuum pad;
   a solenoid operated valve capable of terminating the fluid communication between the vacuum source and the vacuum pad;
   a rotator capable of rotating the vacuum material handler relative to the boom;
   a solenoid operable to control the rotator;
   a control module in communication with the solenoid operated valve; and
   a remote control in wireless communication with the control module via a receiver;
   wherein a manipulation of the remote control provides an interface control of the vacuum material handler.

2. The system of claim 1 further comprising:
   the remote control being in communication with the receiver in a serial communications framing standard format.

3. The system of claim 1 further comprising:
   the remote control being in communication with the receiver in a frequency hopping spread spectrum format.

4. The system of claim 1 further comprising:
   the remote control being capable of providing a haptic signal upon a successful communication with the receiver.

5. The system of claim 1 further comprising:
   an LED on the remote control capable of communicating a lift count.

6. The system of claim 1 further comprising:
   an LED on the remote control capable of communicating a firmware revision.

7. The system of claim 1 further comprising:
   a pendant remote in communication with the remote control and capable of controlling the vacuum material handler.

8. The system of claim 7 further comprising:
   the pendant remote being securable to an operator's wrist.

9. The system of claim 7 further comprising:
   the pendant remote being in communication with the remote control via a hardwire connection.

* * * * *